(No Model.)
R. W. IVY.
COTTON PICKER.
No. 568,351. Patented Sept. 29, 1896.
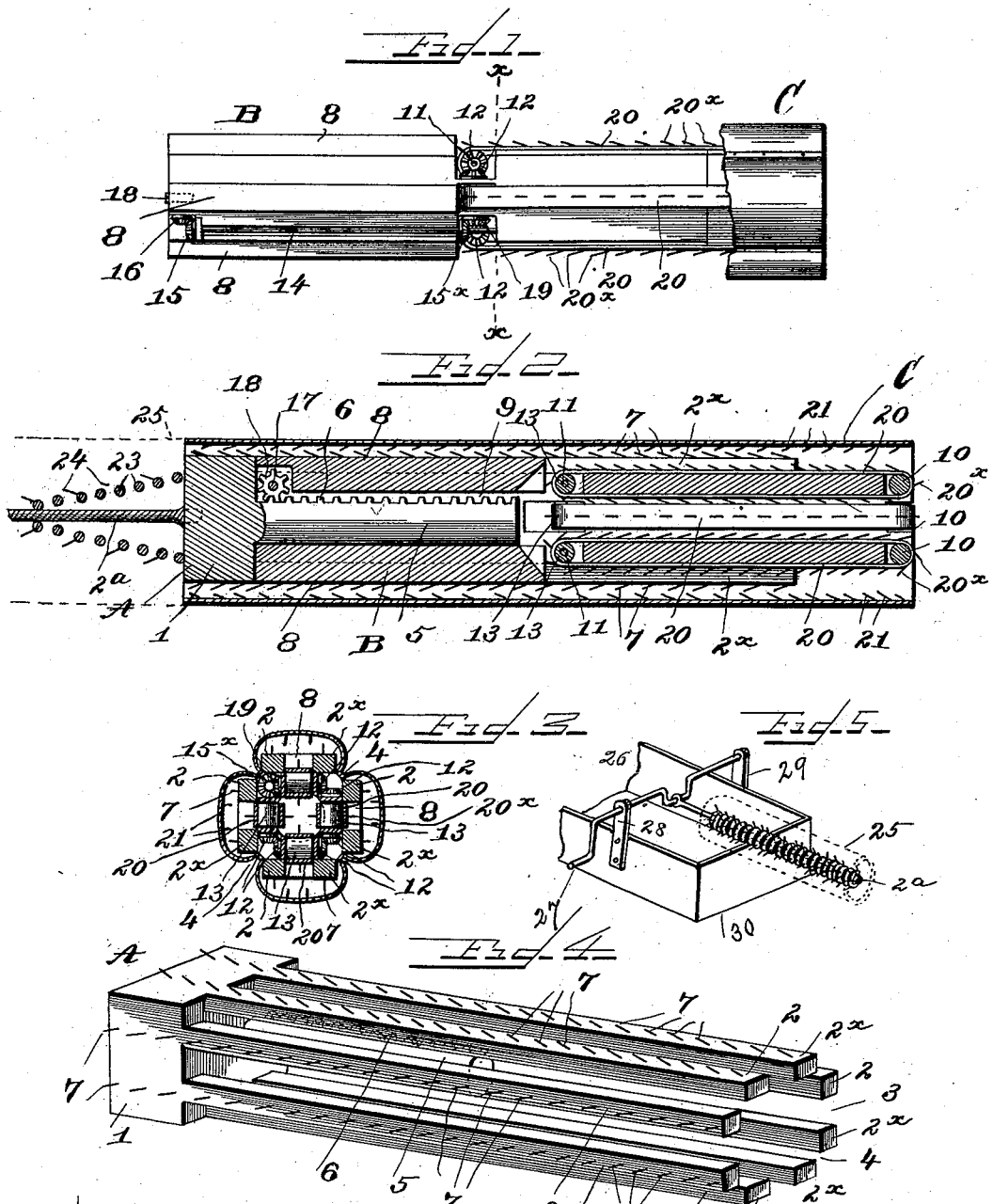
WITNESSES
G. A. Tauberschmidt,
A. G. Heylmun
INVENTOR
Robert W. Ivy
By Wm H. Bates
Attorney

UNITED STATES PATENT OFFICE.

ROBERT W. IVY, OF NEW LONDON, NORTH CAROLINA.

COTTON-PICKER.

SPECIFICATION forming part of Letters Patent No. 568,351, dated September 29, 1896.

Application filed January 16, 1896. Serial No. 575,776. (No model.)

*To all whom it may concern:*

Be it known that I, ROBERT W. IVY, a citizen of the United States, residing at New London, in the county of Stanley and State of North Carolina, have invented certain new and useful Improvements in Cotton-Pickers; and I do hereby declare the following to be a full, clear, and exact description of the invention, such as will enable others skilled in the art to which it appertains to make and use the same.

My invention has relation to improvements in machines for picking cotton from the pods, and the object is to provide a new and useful machine for the purposes intended which is simple in construction and efficient in operation, and which will pick and remove the cotton from the pod without removing the small leaves of the plant, and which will carry the cotton back through a tube or conduit to a receptacle.

I have fully and clearly illustrated my invention in the accompanying drawings, forming a part of this specification, and wherein—

Figure 1 is a plan view of the picking-frame and mechanism. Fig. 2 is a longitudinal central section through the reciprocating feed and driving mechanism frame and picking-frame. Fig. 3 is a transverse section through the reciprocating feed and driving mechanism frame and picking-frame on the line $x\,x$ of Fig. 1. Fig. 4 is a detail view of the reciprocating feed and driving mechanism frame, showing the rack on the stem of the same. Fig. 5 is a perspective view of a portion of a wagon-body and crank-shaft used as the motor for operating the device.

A designates the reciprocating feeding and driving mechanism frame, made of a piece of suitable metal of the requisite size and consisting of a rectangular head-piece 1, formed with parallel projecting bars or arms 2 $2^\times$, extending from the inner end of the head-piece and formed with a space or slot 3 between them and arranged with sufficient space, as 4, between adjacent edges or corners to permit the cover C to be secured to the picker-supporting frame. Centrally projecting from the inner end or face of the feed and driving mechanism frame is a round stem 5 of such length as to accommodate the reciprocations of the feed and driving mechanism frame and formed or provided with a rack-bar 6, extending the length of the stem, to engage with the pinion in the picker-frame to actuate the picking mechanism, as hereinafter specified. On the bars or arms 2 $2^\times$ are secured a series of small prongs or pins 7, the points of which are directed toward the head-piece of the feed and driving mechanism frame, in order that when the feed and driving mechanism frame is pushed forward the pins will slide through the cotton, and then when the handle is pulled back the pins will engage in the cotton and draw it back away from the picking-belts and carry it into the carrying-tube.

B designates the picker-frame, consisting of a suitable piece of metal fitting the interior between the arms of the picker-frame, and formed with longitudinally - arranged guide-pieces 8, extending about one-half the length of the picker and projecting up into the spaces between the arms of the feed and driving mechanism frame to guide that element in its reciprocations. In the center of the picker is formed a round hole or socket 9, entering from the end and extending throughout the length of the body of the picker to take the stem of the feed and driving mechanism frame at the forward portion and to provide a way for the under line of the picker-belts at the forward part of the picker. In the outer end of the picker are journaled four rollers 10, arranged substantially as shown. At about midway of the length of the picker are journaled four shafts or arbors 11, arranged transversely to the axis of the picker and having on their ends intermeshing bevel-gears 12, and each having mounted thereon a small roller 13, on which, respectively, one end of the picker-belt is arranged. Suitably journaled in the edge or corner of the body of the picker is a shaft 14, carrying on its respective ends bevel-gears 15 $15^\times$, the former of which meshes with the bevel-gear 16 on an arbor or shaft 17, mounted in the end of the picker-frame and carrying a small gear-wheel 18, which is engaged by the rack-bar on the stem of the feed and driving mechanism frame. The bevel-gear $15^\times$ engages with a bevel-gear, as 19, on one of the shafts carrying the belt-rollers. On the rollers 13 and 10 are arranged, respectively, the picking-belts 20, provided with picking-pins 20×, which are secured so that as the belts are moved these pins may be forced into a cotton-boll and tear it from the pod and carry the severed cotton back into the flexible tube 25, surrounding the feed and driving mechanism frame, substantially as indicated in Fig. 2 of the drawings. Surrounding the picker is a sheet-metal covering bent to form ways or conduits for the passage of the cotton and secured to the respective corners of the picker, substantially as shown in Fig. 3 of the drawings. In this shell or cover are secured a series of depending pins 21, having their points directed toward the head of the picker to prevent the cotton from being carried back when the feed and driving mechanism frame is reciprocated.

On the end of the feed and driving mechanism frame is secured a flexible wire cable $2^a$, which has its other end secured to a transversely-arranged crank-shaft 26, having a crank 27 formed on the end thereof, this crank-shaft having its bearings in the upper ends of two short uprights 28 29, secured to the sides of a wagon-body 30, as shown in Fig. 5 of the drawings. The cable $2^a$ is formed only slightly flexible, so that when the power is applied and motion imparted to it for operating the feed and driving mechanism of the device through the medium of the crank-shaft arranged across the wagon-body it will enable said cable to reciprocate the feed and driving mechanism in both directions. To the head of the feed and driving mechanism frame is secured one end of a spiral wire tube 23, provided with spurs or pins 24, directed toward the discharge end of the cotton-carrying tube 25, indicated in dotted lines, having one end secured to the covering-tube of the picker and the other end opening into any convenient receptacle. This spiral wire tube or coil surrounding the cable, having the pins secured thereon, serves the purpose of conducting the cotton through the cotton-tube after it has been picked by the picking-belts in the picker-belt-supporting frame and carried along from thence to the feed and driving mechanism to the delivery end of the tube for the delivery of the same to any proper receptacle to receive it.

The operation of the machine is as follows: The device being set in motion to reciprocate the feed and driving mechanism through connection to the wire cable $2^a$, the device is grasped by the hand, and with the belts in motion the end of the picker is carried adjacent to the cotton-boll, so that the pins of the belts will be projected into the cotton, and then the continued motion of the pins and belts will tear the cotton off and carry it back through the machine, and by the pressure of accumulated cotton and the force of the reciprocations of the feed and driving mechanism frame the cotton is carried through the tube to the place of deposit.

Having thus described my invention, what I claim, and desire to secure by Letters Patent, is—

1. In a cotton-picker, a suitable reciprocating feed and driving mechanism frame, a picker-belt-supporting frame, picker-belts provided with pins to pick the cotton, a covering over the picker, and feed and driving mechanism, and mechanism to move the picker-belts by the reciprocation of the feed and driving mechanism frame, substantially as described.

2. In a cotton-picker, the combination of the feed and driving mechanism A, comprising a head-piece and parallel arms extending therefrom, and formed with a central stem extending between the arms and having a rack-bar on the stem, the picker-belt-supporting frame B, formed to fit within the arms of the feed and driving mechanism, and having a central opening throughout its length, rollers journaled in the picker-belt-supporting frame, picker-belts on the rollers provided with picking-pins, a pinion on the picker-belt-supporting frame engaging the rack-bar, mechanism between the belt-rollers and the pinion to move the belts, and a mechanism to reciprocate the feed and driving mechanism, substantially as described.

3. In a cotton-picker, the combination of the feed and driving mechanism, comprising a head-piece and parallel arms extending therefrom and formed with a central stem projecting between the arms and a rack-bar on the stem, a picker-belt-supporting frame B, formed to slidingly fit between the arms and having a central opening throughout its length, rollers journaled in the picker-belt-supporting frame, belts on the rollers provided with pins, a covering attached to the picker-belt-supporting frame mechanism formed with passages to pass the cotton through, and having pins to keep the cotton from moving in the wrong direction, gearing engaging the rack-bar and rollers and mechanism to reciprocate the feed and driving mechanism and operate the belts, as set forth.

In testimony whereof I affix my signature in presence of two witnesses.

ROBERT W. IVY.

Witnesses:
JOS. H. BLACKWOOD,
WM. H. BATES.